United States Patent
Liu et al.

(10) Patent No.: US 10,344,391 B2
(45) Date of Patent: Jul. 9, 2019

(54) FE-NI-P-RE MULTICOMPONENT ALLOY PLATING LAYER, AND ELECTRODEPOSITION PREPARATION METHOD AND APPLICATION THEREOF

(71) Applicant: INSTITUTE OF METAL RESEARCH CHINESE ACADEMY OF SCIENCES, Liaoning (CN)

(72) Inventors: Zhiquan Liu, Liaoning (CN); Di Wu, Liaoning (CN); Liyin Gao, Liaoning (CN); Jingdong Guo, Liaoning (CN)

(73) Assignee: INSTITUTE OF METAL RESEARCH, CHINESE ACADEMY OF SCIENCES, Liaoning (CN)

( * ) Notice: Subject to any disclaimer, the term of this patent is extended or adjusted under 35 U.S.C. 154(b) by 844 days.

(21) Appl. No.: 14/784,177

(22) PCT Filed: Oct. 24, 2013

(86) PCT No.: PCT/CN2013/085885
§ 371 (c)(1),
(2) Date: Oct. 13, 2015

(87) PCT Pub. No.: WO2015/054930
PCT Pub. Date: Apr. 23, 2015

(65) Prior Publication Data
US 2016/0053396 A1 Feb. 25, 2016

(30) Foreign Application Priority Data
Oct. 16, 2013 (CN) .......................... 2013 1 0489128

(51) Int. Cl.
*C25D 3/56* (2006.01)
*B32B 15/01* (2006.01)
(Continued)

(52) U.S. Cl.
CPC ............ *C25D 3/562* (2013.01); *B32B 15/015* (2013.01); *C25D 3/56* (2013.01); *C25D 5/34* (2013.01); *C25D 21/12* (2013.01); *C25D 21/14* (2013.01)

(58) Field of Classification Search
CPC .................................. C25D 3/562; C25D 3/56
(Continued)

(56) References Cited

U.S. PATENT DOCUMENTS

| 3,271,276 A | * | 9/1966 | Di Guilio | ............... C25D 3/56 148/312 |
| 5,013,411 A | * | 5/1991 | Minowa | ............... H01F 1/0577 148/102 |
| 2005/0263216 A1 | * | 12/2005 | Chin | ............... C22C 45/02 148/304 |

FOREIGN PATENT DOCUMENTS

| CN | 1051060 A | 5/1991 |
| CN | 1978710 A | 6/2007 |

(Continued)

OTHER PUBLICATIONS

Li et al., "Effects of Rare Earth on Composite Ni-Fe-P-RE Alloy Coating," Electroplating & Pollution Control (Jul. 2007), vol. 27, No. 4, pp. 1-10. (Year: 2007).*

(Continued)

*Primary Examiner* — Edna Wong
(74) *Attorney, Agent, or Firm* — Smith, Gambrell & Russell, LLP

(57) ABSTRACT

An Fe—Ni—P-RE multicomponent alloy plating layer, electrodeposition preparation method, and plating application. The alloy plating layer obtained via electrodeposition contains elements Fe, Ni, P and RE, with the following mass percentages Fe— 16%-65%, Ni— 25%-70%, combined Fe and Ni— 63%-91%, RE 1.6%-25%, and the balance being P. The plating solution mainly contains the following com-
(Continued)

ponents: ferrous salt, nickel salt, $NaH_2PO_2$, $RECl_3$, $H_3BO_3$ and $Na_3C_6H_5O_7$. A multicomponent alloy plating layer of different components can be obtained by adjusting the main salt and complexing agent in the plating solution and by adjusting the process Enabled is controllable adjustment to the components of the obtained plating layer while saving costs, improved characteristics such as the thermal expansion coefficient, electrical property, magnetic property, etc., and products and methods very suitable for applications in the field of micro-electronics.

13 Claims, 9 Drawing Sheets

(51) Int. Cl.
 *C25D 5/34* (2006.01)
 *C25D 21/12* (2006.01)
 *C25D 21/14* (2006.01)
(58) Field of Classification Search
 USPC .................................. 205/258, 259
 See application file for complete search history.

(56) References Cited

FOREIGN PATENT DOCUMENTS

| | | |
|---|---|---|
| CN | 101311307 | 11/2008 |
| CN | 101353790 A | 1/2009 |
| JP | S6167754 A | 4/1986 |
| JP | H01-180994 | 7/1989 |
| JP | H0729734 A | 1/1995 |

OTHER PUBLICATIONS

International Search Report for PCT/CN2013/085885, dated Jul. 29, 2014 in English & Chinese Language.
Written Opinion of the International Search Authority dated Jul. 29, 2014 for International Patent Application No. PCT/CN2013/085885 (5 pages in Chinese with English Translation).
International Preliminary Report on Patentability dated Apr. 16, 2016 for International Patent Application No. PCT/CN2013/085885 (6 pages in Chinese with English Translation).
Chinese Search Report for Chinese Patent Application No. 2013104891284 dated Feb. 29, 2016 (1 page).
Chinese Office Action for Chinese Patent Application No. 2013104891284 dated Apr. 1, 2016 (5 pages in Chinese with English Translation).
Li, Jin-hui, et al. Effects of Rare Earth on Composite Ni-Fe-P-RE Alloy Coating. Electroplating & Pollution Control. 2007. vol. 27, No. 4, pp. 12-13. English abstract on p. 1.
Weng, Sen-Lin, et al. Mechanism of Electro Deposition of Fe-Ni-P Alloy. Journal of Huaqiao University (Natural Science). 2007. vol. 28, No. 3, pp. 275-277. English abstract on p. 3.

* cited by examiner

FE-NI-P-RE MULTICOMPONENT ALLOY PLATING LAYER, AND ELECTRODEPOSITION PREPARATION METHOD AND APPLICATION THEREOF

TECHNICAL FIELD

The present invention relates to the field of electroplating, specifically to a Fe—Ni—P-RE multicomponent alloy plating layer and the electrodeposition method and application thereof. The prepared alloy plating layer is suitable for applications in fields such as microelectronics and semiconductor function devices.

BACKGROUND OF THE INVENTION

Fe—Ni alloys represented by Invar alloy, Kovar alloy and perm-alloy, are widely accepted for their advantages of the performance in thermal expansion and soft magnetic properties. In recent years, following the development of technologies in the microelectronics industry, the advantages of Fe—Ni alloy materials in nature such as lead-free solder-ability and interface reaction rate are gradually being recognized by researchers and investigated in depth. The related achievements are being published continuously from the studies. A large amount of study data shows that Fe—Ni thin film materials hold good solder-ability and slow interface reaction rate. It lays the foundation for the wide application of Fe—Ni thin film materials in the microelectronics industry. Nevertheless, if used as magnetic core of inductor devices in chips, the existing Fe—Ni thin film materials tend to consume energy in their high-frequency application, which results in a rapid decrease of inductance and lost advantages in power conversion. Therefore, more research is urged to carry out further studies in order to improve the performance of materials.

Compared with the preparation methods such as magnetron sputtering, chemical vapor deposition (CVD) and atom layer deposition frequently used in the microelectronics industry, the electroplating method is preferred in the industries due to its advantages of low upfront investment on equipment, easy and feasible operation, short cycle of material preparation, high efficiency, low operation cost, etc.

SUMMARY OF THE INVENTION

In view of the shortcomings of existing technologies, the present invention aims to provide a Fe—Ni—P-RE multicomponent alloy plating layer as well as the electrodeposition method and application thereof.

Through adding appropriate additives and adjusting the process parameters, an alloy plating layer with controllable composition is obtained through electroplating.

In order to realize the purposes above, the technical scheme of the present invention is:

A Fe—Ni—P-RE multicomponent alloy plating layer that is plated on a substrate by means of electroplating comprises the elements of Fe, Ni, P and RE, wherein the mass percentages of various elements are respectively: Fe being 20~65%, Ni being 25~70%, Fe+Ni being 65~90%, RE being 2~25%, the balance being P; and RE being rare earth element.

Said rare earth element is one or two selected from La, Ce, Pr, Nd, Eu, Gd and Tb.

Said substrate is copper or other metal material.

An electrodeposition preparation method of said Fe—Ni—P-RE multicomponent alloy plating layer that the alloy layer is electrically deposited on substrate at constant voltage or constant current, wherein: the used plating solution comprises main salt(s), complexing agent(s) and water, the chemical composition and concentration of said main salt(s) are: ferrite being 0.01-0.09 mol/L, nickel salt(s) being 0.01-0.09 mol/L, $NaH_2PO_2$ being 0.1 mol/L, $RECl_3$ being 0.5-4 g/L, $H_3BO_3$ being 0.5 mol/L, said complexing agent being $Na_3C_6H_5O_7$ with a concentration of 0.1-0.2 mol/L in the plating solution, the balance being water. HCl or $H_2SO_4$ is used to adjust the pH value of the plating solution to 2~5 and the temperature of the plating solution is 45~70° C.

The current density at constant current is 3.0~9.0 $A/dm^3$ and the voltage at constant voltage is −0.9~−3.0 V.

In said plating solution, the ferrite(s) is one or two selected from $FeSO_4$ and $FeCl_2$. The nickel salt(s) is one or two from $NiSO_4$ and $NiCl_2$. Said plating solution can also comprise an assistant complexing agent(s) to promote co-deposition of multicomponent system whose concentration is 0.005-0.015 mol/L.

Said assistant complexing agent(s) can be one or two from EDTA-2Na or $NH_4Cl$.

Said plating solution can also comprise a brightener and a wetting agent to improve the surface quality of plating. Said brightener is saccharin sodium or butynediol with a concentration of 0.5-2.5 g/L. Said wetting agent is sodium dodecyl sulfate with a concentration of 0.1-0.5 g/L.

According to the present invention, before electrodeposition of alloy plating layer on a substrate, a copper sheet is treated on the surface to remove any dust, oil or grease and oxide, etc. Then 5% $H_2SO_4$ is used to activate its surface. Then the substrate is washed with de-ionized water before placed in a plating tank to carry out electrodeposition process.

The ratio among different components in the plating layer can be adjusted through modifying the content(s) of the main salt(s), the content(s) of the complexing agent(s) in the plating solution and any one or more process parameters during the process of electrodeposition.

The alloy plating layer according to the present invention is applied in the fields such as microelectronics and semiconductor function devices.

The principle of the present invention is as follows:

The magnetism of solid material comes from the spin and orbital motion of various charged particles. As for transition metals, the wave functions of 3d electrons overlap between each other to provide the metals such as Fe, Co, Ni, Yb, Gd and their alloys ferromagnetism through direct exchange interaction. As for rare earth metals, the 4f electron cloud of the adjacent atoms do not overlap with each other. But the s itinerant electrons can function as a medium through indirect exchange interaction to cause f electrons to change spin orientation and hence show spin magnetization: for light rare earth metals whose atomic number is smaller than Gd, the magnetic moment of 3d atom is parallel with the magnetic moment of 4f atom, so the magnetic moments of them ferromagnetic couple with each other; for heavy rare earth metal whose atomic number is higher than Gd, the corresponding magnetic moments are anti-parallel showing ferri-magnetic coupling effect. If the rare earth element(s) is added in Fe, Ni, the Slater-Pauling curve can be used to analyze the atomic magnetic moment and the magneto-crystalline anisotropy exerted by rare earth metal. Meanwhile, with the synergistic effect from the factors such as crystallite size, structure and material internal stress, the magnetism of material can also be controllable. The present invention adds an appropriate amount of rare earth element(s) in the FeNi(P) alloy to realize a controllable management on the magnetic performances of material such as coercivity, magnetization intensity and magnetic anisotropy. Through adding P element in the plating solution, the electrical property of the plating layer is improved and hence the energy loss at high frequency can be decreased. Through adding rare earth element(s), the performances are improved in terms of the stability of plating solution, the magnetic performance of plating layer and the corrosion resistance. The method according to the present invention can produce a multicomponent alloy plating layer with different compositions through adjusting the formula of plating solution and the parameters of plating process. Hence, the material indices such as thermo expansion coefficient, resistivity, and saturation magnetic induction can be further regulated to expand the application of Fe—Ni alloy materials.

The present invention has the following advantages:

1. The present invention can produce a Fe—Ni—P-RE multicomponent alloy plating layer. Through adjusting the content(s) of the main salt(s) and the content(s) of the complexing agent(s) in the plating solution as well as the process parameters during electrodeposition, the alloy plating layer can be produced to have different compositions so as to expand the application of materials.

2. In the Fe—Ni—P-RE multicomponent alloy plating layer prepared according to the present invention, the mass percentage of Fe in the plating solution is 20%-65%, 25%-70% for Ni, 65%-90% for sum of Fe and Ni. The ratio between Fe, Ni and rare earth component can be adjusted to realize the modification on thermal expansion coefficient, magnetic property, and electrical property of film material.

3. The Fe—Ni—P-RE plating layer prepared according to the present invention has an improved of electric property through adding P element in the plating solution to reduce the energy loss at high-frequency application. Through adding rare earth element, the magnetic property of plating layer is improved. Meanwhile, the surface quality is also improved without adding any additive.

4. The plating solution system used in the present invention is simple, stable, low in concentration of various components, easy to extend the application and economically beneficial in saving cost.

DETAILED DESCRIPTION OF THE PREFERRED EMBODIMENTS

Figure 1:
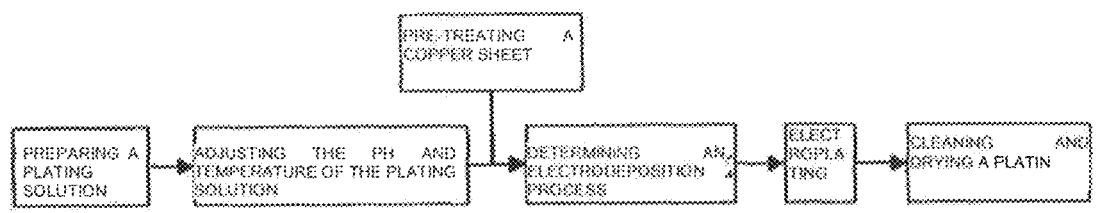
FIG. 1 is the process flow chart.

The process flow chart of the present invention is as shown in FIG. 1 and specified as follows:

The plating solution according to the present comprises main salt(s), complexing agent(s) and water.

The chemical composition and concentration of said main salt(s) are: ferrite of 0.01-0.09 mol/L, nickel salt(s) of 0.01-0.09 mol/L. $NaH_2PO_2$ of 0.1 mol/L, $RECl_3$ of 0.5-4 g/L, $H_3BO_3$ of 0.5 mol/L; said complexing agent is $Na_3C_6H_5O_7$ of a concentration of 0.1-0.2 mol/L in the plating solution, the balance being water. HCl or $H_2SO_4$ is used to adjust the pH value of the plating solution to 2~5, and the temperature of the plating solution is 45~70° C.

On the basis of the basic composition as above, the plating solution according to the present invention can also further comprise assistant complexing agent(s) (EDTA-2Na and/or $NH_4Cl$) to promote co-deposition of multicomponent system. Brightener (including but not limit to saccharin sodium, butynediol) and wetting agent (sodium dodecyl sulfate), etc., can also be added to improve the surface quality of the plating layer.

The formulating method according to the present invention is: adding $H_3BO_3$ into appropriate amount of de-ionized water to dissolve completely, then adding $Na_3C_6H_5O_7.2H_2O$ into the solution with agitating, and then adding the raw materials of the main salts such as $FeSO_4.7H_2O$, $NiSO_4.6H_2O$, $NaH_2PO_2.H_2O$ and $RECl_3.nH_2O$ in turn with agitating to mix evenly, if necessary, adding the solutions of a brightener, wetting agent and so forth, at last adding the de-ionized water to the specified volume.

The electrodeposition process according to the present invention is: adjusting the pH value of the plating solution to 2-5 with HCl or $H_2SO_4$, then heating to 45-70° C.; meanwhile, treating the surface of substrate (copper sheet or other metal material) to remove any dust, oil or grease, oxide, etc. Specifically, using 5 wt. % diluted solution of $H_2SO_4$ to activate the surface and washing away the de-ionized water before placing it in the plating tank; carrying out the electrodeposition process at constant voltage or constant current.

EXAMPLE 1

Treat the surface of copper sheet substrate: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.039 mol/L, $NiSO_4$ of 0.061 mol/L, $NaH_2PO_2$ of 0.1 mol/L, $CeCl_3$ of 1 g/L, $H_3BO_3$ of 0.5 mol/L, $Na_3C_6H_5O_7$ of 0.1 mol/L, the balance being water. Adjust the pH value of the plating solution to 2 and heat it to 57° C. Then select a constant voltage of −1.05V and an electroplating duration of 5 min to carry out the electrodeposition process.

Figure 2:
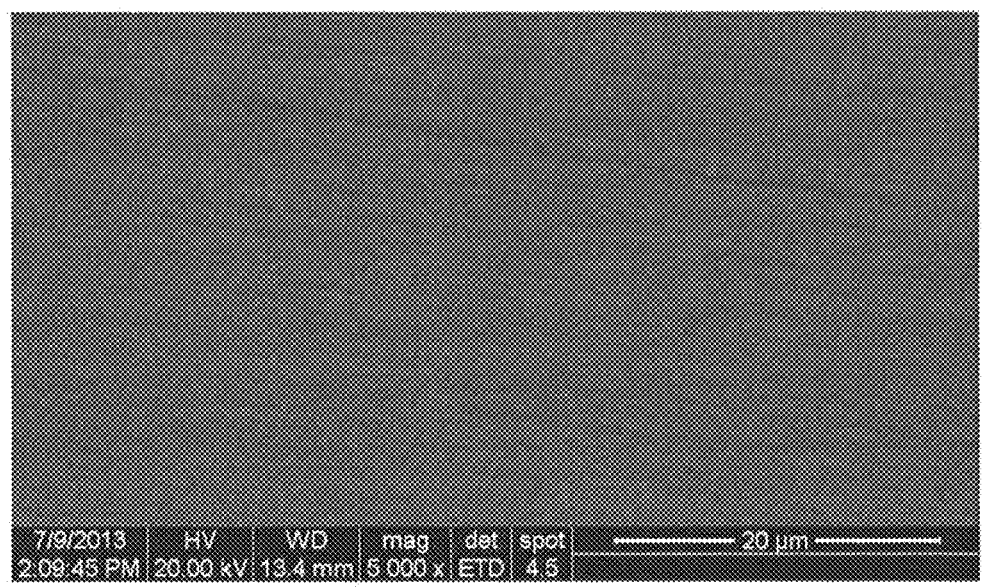
FIG. 2 is the morphology picture of the sample plating layer of example 1.
Figure 3:
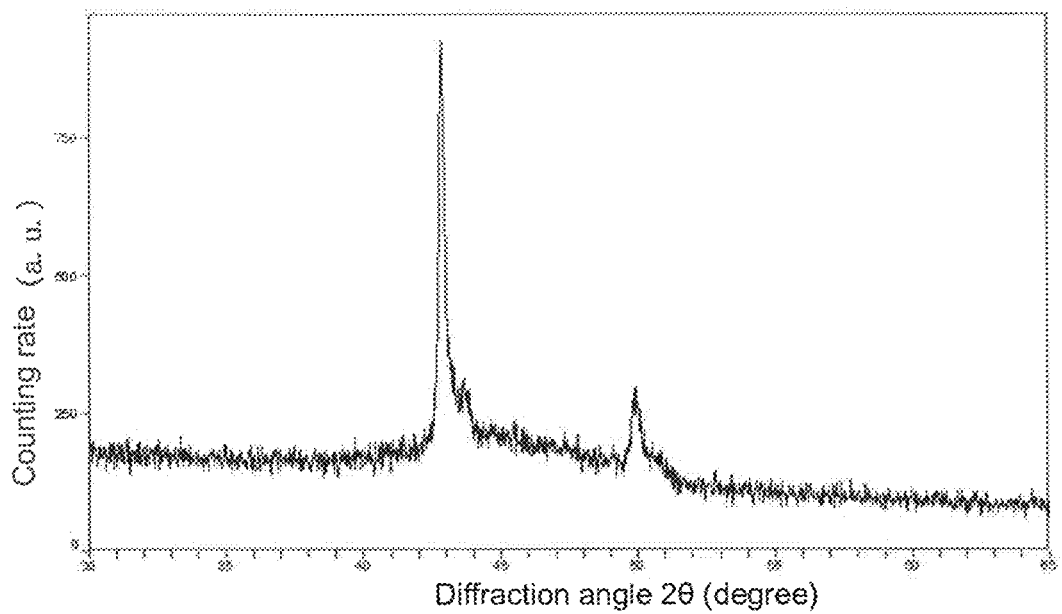
FIG. 3 is the X-Ray diffraction spectrum of the sample plating layer of example 1.
Figure 4:
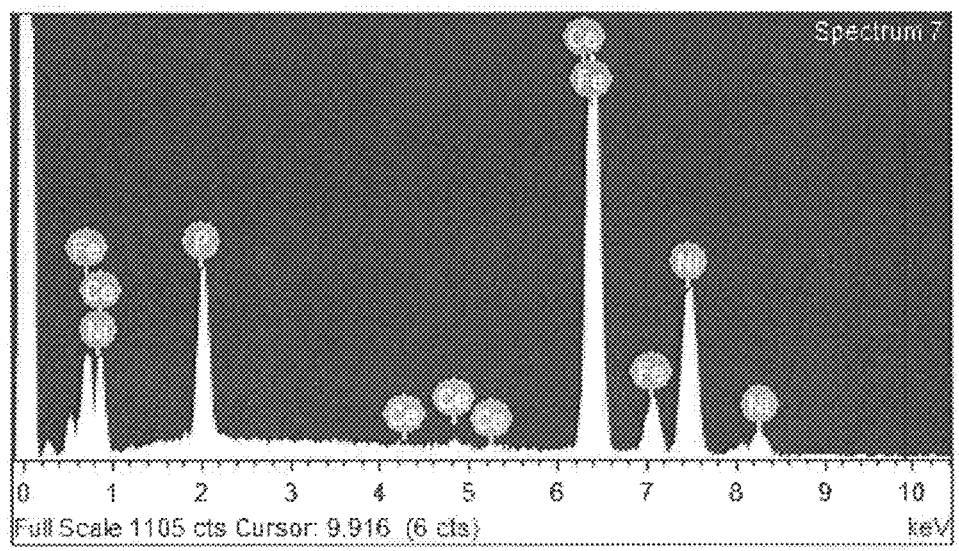
FIG. 4 is the composition analytical curve of the sample plating layer of example 1.

The surface morphology of the plating layer is as shown in FIG. 2. The X-Ray diffraction spectrum of the plating layer is as shown in FIG. 3. The composition analytical curve of the plating layer is as shown in FIG. 4 and the composition of the prepared plating layer is: 54.25Fe 34.87Ni 9.25P1.63Ce (mass percentage).

EXAMPLE 2

Treat the surface of copper sheet substrate: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.020 mol/L, $NiSO_4$ of 0.080 mol/L, $NaH_2PO_2$ of 0.1 mol/L, $CeCl_3$ of 1 g/L, $H_3BO_3$ of 0.5 mol/L, $Na_3C_6H_5O_7$ of 0.1 mol/L, the balance being water. Adjust the pH value of the plating solution to 2 and heat it to 55° C. Then select a constant voltage of −1.20V and an electroplating duration of 10 min to carry out the electrodeposition process.

Figure 5:
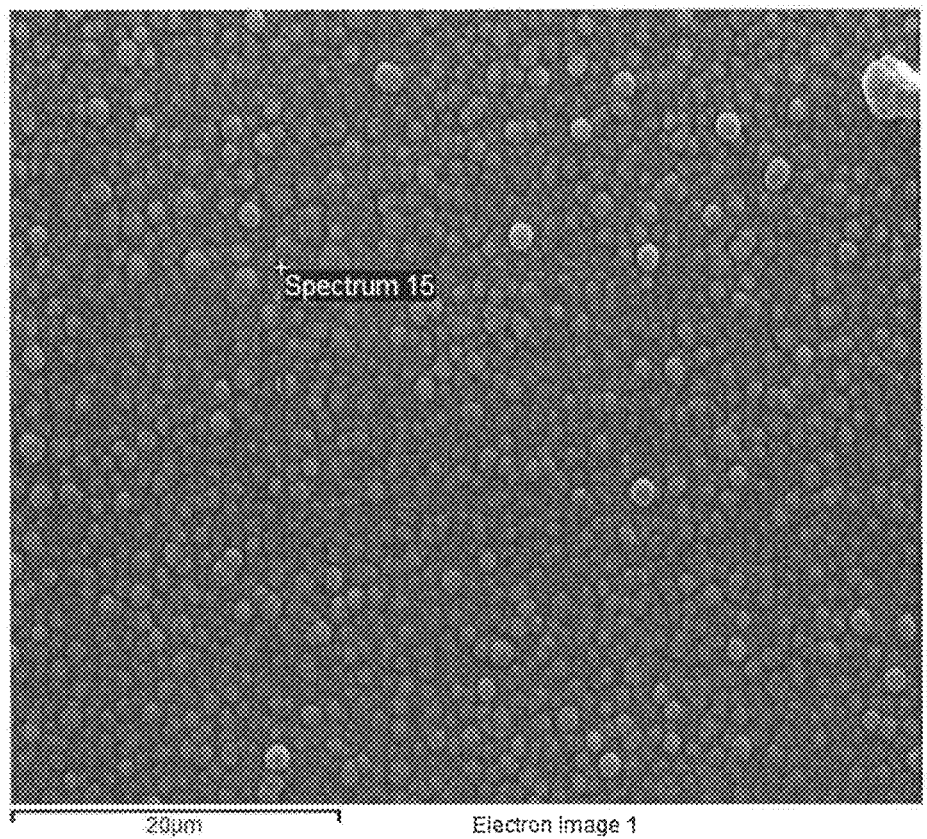
FIG. 5 is the morphology picture of the sample plating layer of example 2.
Figure 6:
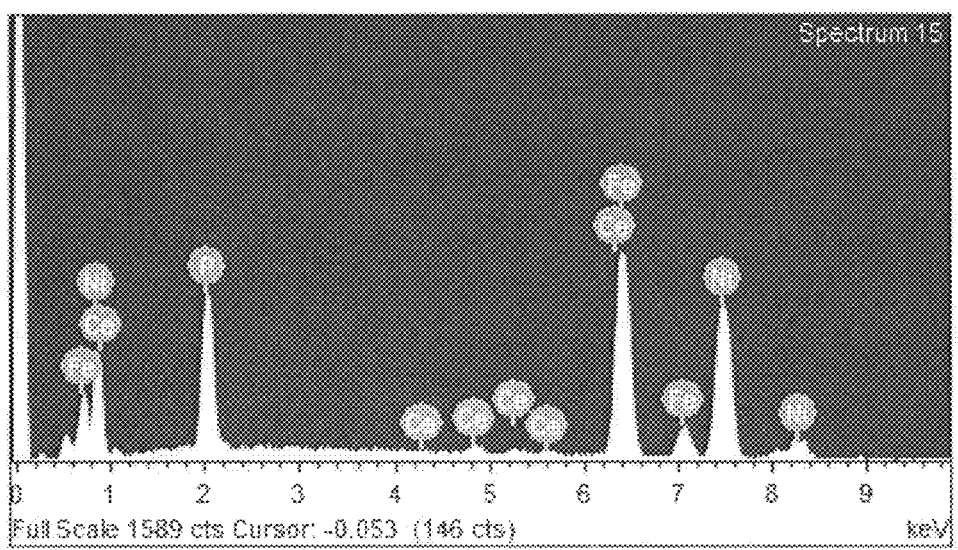
FIG. 6 is the composition analytical curve of the sample plating layer of example 2.

The surface morphology of the plating layer is as shown in FIG. 5. The composition analytical curve of the plating layer is as shown in FIG. 6 and the composition of the prepared plating layer is: 38.27Fe 46.8Ni 12.4P2.54Ce (mass percentage).

The thickness of the copper substrate is 250 μm, the thickness of the plating layer is 2.39 μm and the total magnetic moment in the direction parallel to the plating layer is 23.90 memu.

EXAMPLE 3

Treat the surface of copper sheet substrate: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.010 mol/L, $NiSO_4$ of 0.090 mol/L, $NaH_2PO_2$ of 0.1 mol/L, $CeCl_3$ of 1 g/L, $H_3BO_3$ of 0.5 mol/L, $Na_3C_6H_5O_7$ of 0.1 mol/L, the balance being water. Adjust the pH value of the plating solution to 2 and heat it to 55° C. Then select a constant voltage of −1.05V and an electroplating duration of 10 min to carry out the electrodeposition process.

Figure 7:
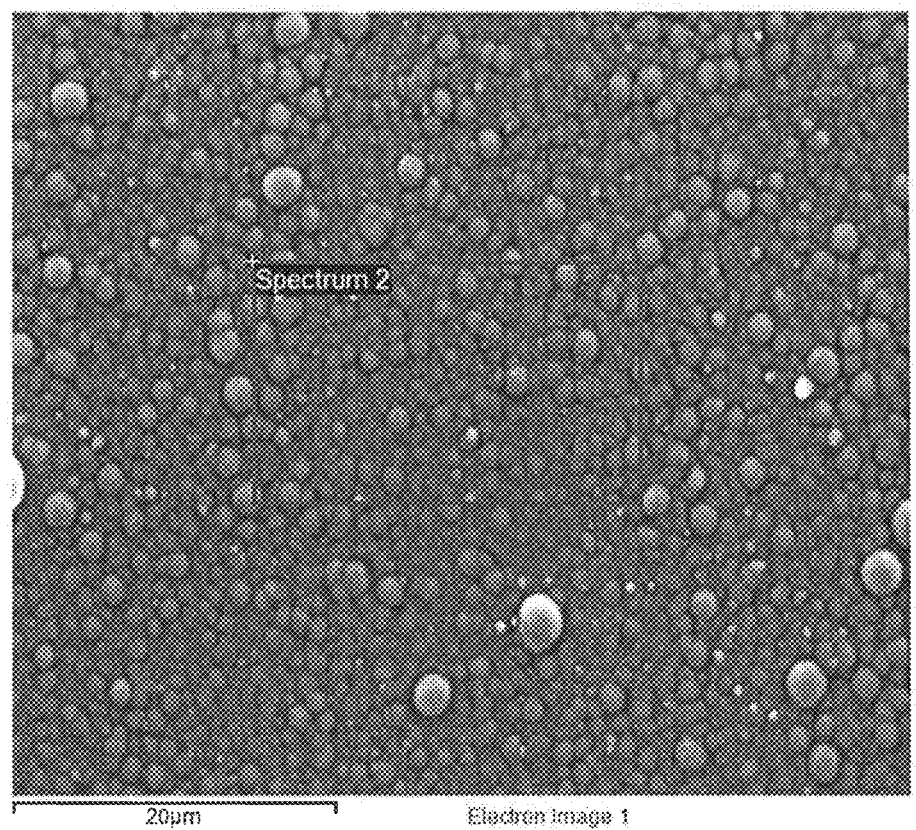
FIG. 7 is the morphology picture of the sample plating layer of example 3.
Figure 8:
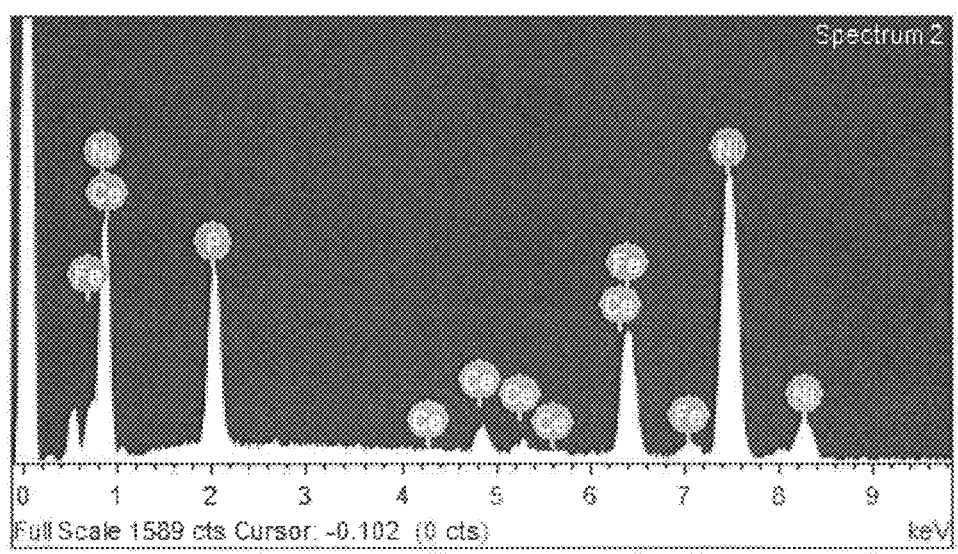
FIG. 8 is the composition analytical curve of the sample plating layer of example 3.

The surface morphology of the plating layer is as shown in FIG. 7. The composition analytical curve of the plating layer is as shown in FIG. 8 and the composition of the prepared plating layer is: 16.83Fe 65.54Ni 11.56P6.07Ce (mass percentage).

EXAMPLE 4

Treat the surface of copper sheet substrate: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.039 mol/L, $NiSO_4$ of 0.061 mol/L, $NaH_2PO_2$ of 0.1 mol/L, $LaCl_3$ of 1 g/L, $H_3BO_3$ of 0.5 mol/L, $Na_3CH_5O_7$ of 0.1 mol/L, the balance being water. Adjust the pH value of the plating solution to 2 and heat it to 55° C. Then select a constant voltage of −1.2V and an electroplating duration of 5 min to carry out the electrodeposition process.

Figure 9:
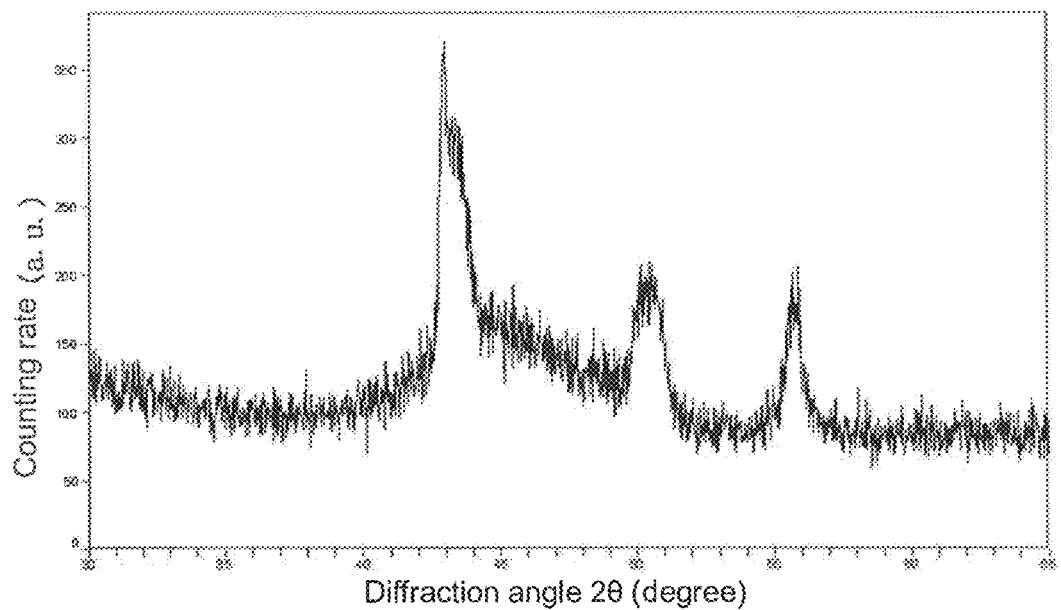
FIG. 9 is the X-Ray diffraction spectrum of the sample plating layer of example 4.
Figure 10:
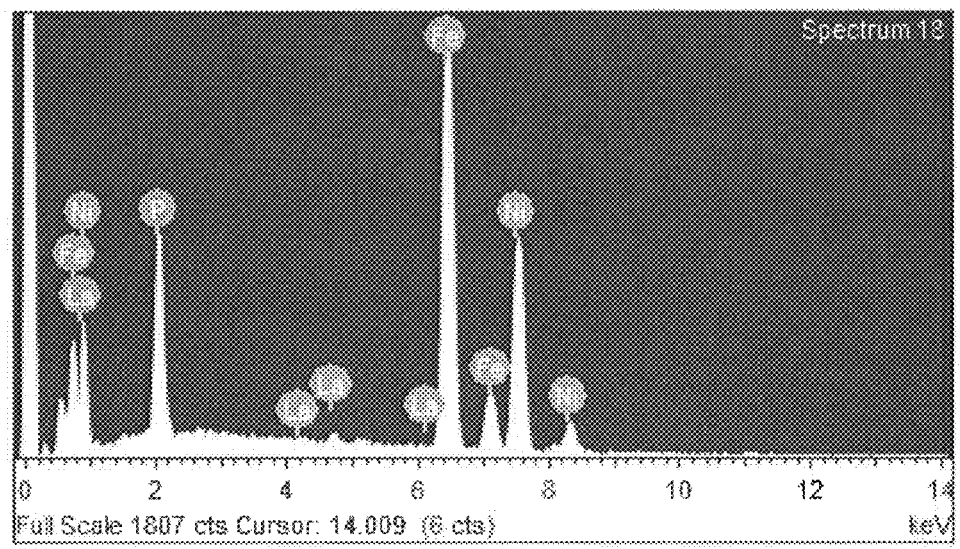
FIG. 10 is the composition analytical curve of the sample plating layer of example 4.

The X-Ray diffraction spectrum of the plating layer is as shown in FIG. 9. The composition analytical curve of the plating layer is as shown in FIG. 10 and the composition of the prepared plating layer is: 48.77Fe 39.26Ni 10.16P1.80La (mass percentage).

The thickness of the sample copper substrate is 250 μm, the thickness of the plating layer is 4.29 μm, the surface resistance of the plating layer is measured as $9.32*10^{-5}\Omega$ and the total magnetic moment in the direction parallel to the plating layer is 98.92 memu.

EXAMPLE 5

Treat the surface of copper sheet substrate: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.020 mol/L, $NiSO_4$ of 0.080 mol/L, $NaH_2PO_2$ of 0.15 mol/L, $CeCl_3$ of 1 g/L, $H_3BO_3$ of 0.5 mol/L, $Na_3C_6H_5O_7$ of 0.1 mol/L, the balance being water. Adjust the pH value of the plating solution to 2 and heat it to 55° C. Then select a constant voltage of −1.05V and an electroplating duration of 30 min to carry out the electrodeposition process.

The composition of the prepared plating layer is: 27.97Fe 35.73Ni 13.56P22.74Ce (mass percentage).

The thickness of the sample copper substrate is 250 μm, the thickness of the plating layer is 2.11 μm, the surface resistance of the plating layer is measured as $2.33*10^{-5}\Omega$ and the total magnetic moment in the direction parallel to the plating layer is 19.85 memu.

EXAMPLE 6

Carry out sputter deposition of 100 nm of Ti layer and 400 nm of Cu layer on a wafer and then dice it to appropriate size; treat the surface of the sample: remove any dust, oil or grease, oxide; use 5% diluted solution of $H_2SO_4$ to activate the surface and wash it with the de-ionized water before placing it in the plating tank. The composition of the plating solution is: $FeSO_4$ of 0.039 mol/L, $NiSO_4$ of 0.061 mol/L, $NaH_2PO_2$ of 0.1 mol/L, $CeCl_3$ of 1 g/L, $H_3BO_3$ of 0.5 mol/L, $Na_3C_6H_5O_7$ of 0.1 mol/L, the balance being water. Adjust the pH value of the plating solution to 2 and heat it to 55° C. Then select a constant voltage of 0.36 A and an electroplating duration of 30 min to carry out the electrodeposition process.

Figure 11:
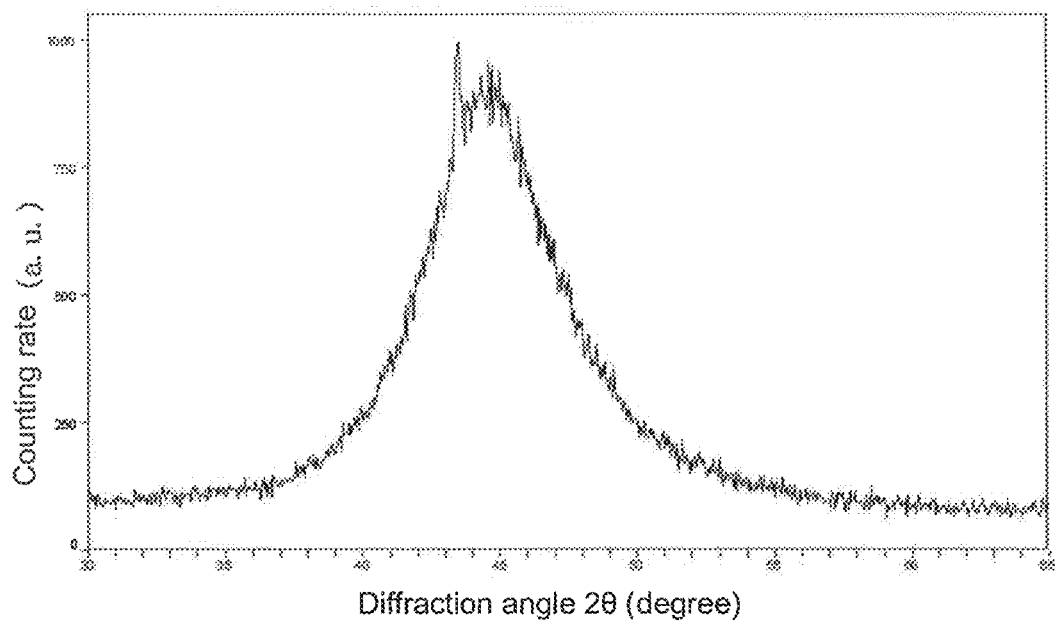
FIG. 11 is the X-Ray diffraction spectrum of the sample plating layer of example 6.
Figure 12:
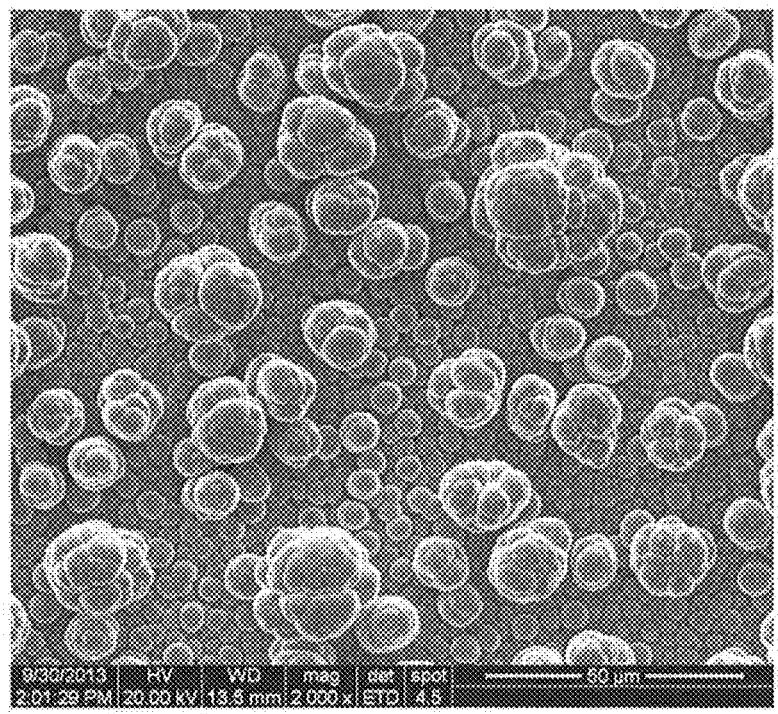
FIG. 12 is the morphology picture of the sample plating layer of example 6.
Figure 13:
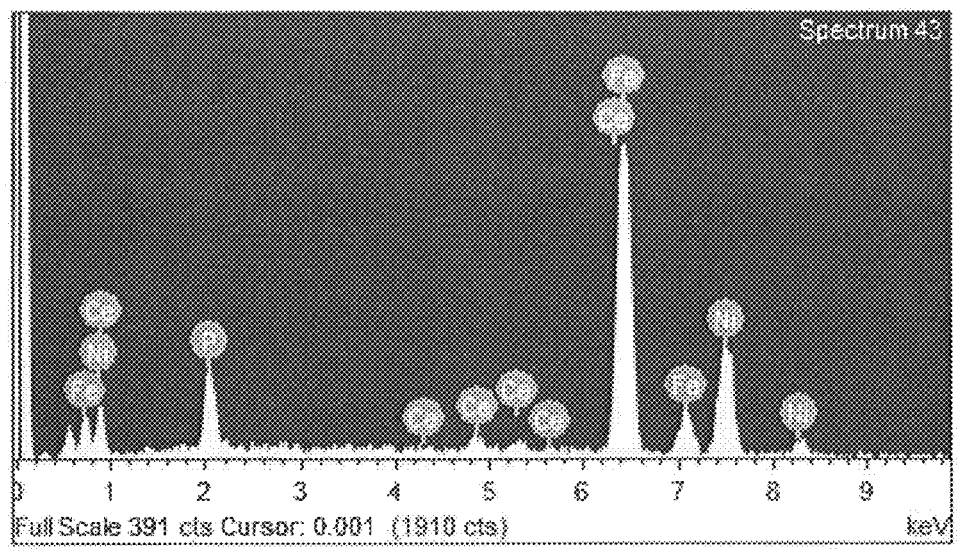
FIG. 13 is the composition analytical curve of the sample plating layer of example 6.
Figure 14:
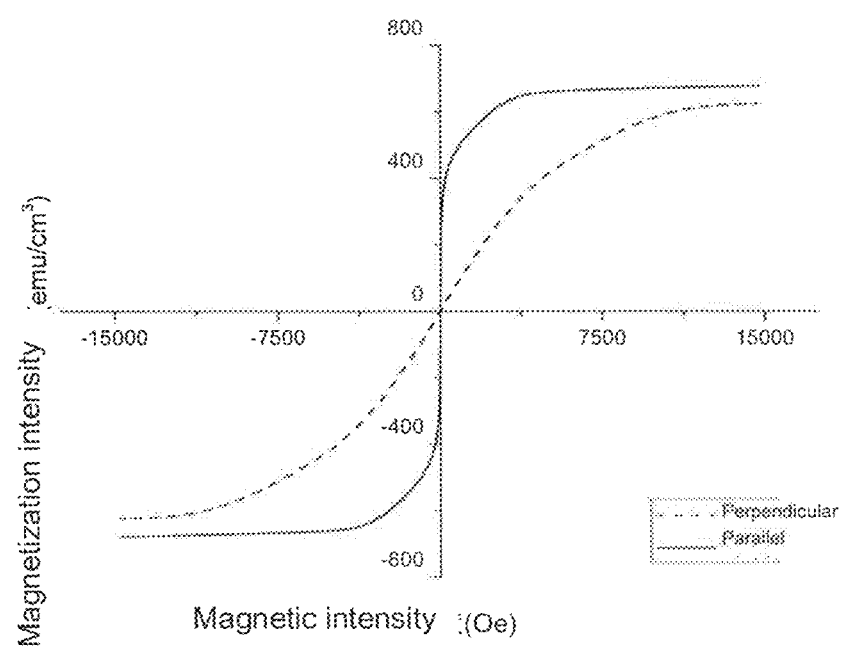
FIG. 14 is the magnetic performance curve of the sample plating layer of example 6.

The X-Ray diffraction spectrum of the plating layer is as shown in FIG. 11. The surface morphology of the plating layer is as shown in FIG. 12. The composition analytical curve of the plating layer is as shown in FIG. 13 and the composition of the prepared plating layer is: 58.18Fe 31.72Ni 6.13P3.97Ce (mass percentage). The thickness of the plating layer is 19.9 μm and the resistivity of the plating layer is measured as 3.45 Ω·μm. The hysteresis loop of the plating layer is as shown in FIG. 14. The coercivity in the direction parallel to the plating layer is 4.99 Oe and the magnetization intensity is 677.99 emu/cm$^3$. The coercivity in the direction perpendicular to the plating layer is 28.46 Oe and the magnetization intensity is 677.99 emu/cm$^3$.

EXAMPLE 7

Carry out sputter deposition of 100 nm of Ti layer and 400 nm of Cu layer on a wafer and then dice it to appropriate size; treat the surface of the sample: remove any dust, oil or grease, oxide; use 5% diluted solution of $H_2SO_4$ to activate the surface and wash it with the de-ionized water before placing it in the plating tank. The composition of the plating solution is: FeSO$_4$ of 0.03 mol/L, NiSO$_4$ of 0.07 mol/L, NaH$_2$PO$_2$ of 0.1 mol/L, LaCl$_3$ of 1 g/L, H$_3$BO$_3$ of 0.5 mol/L, Na$_3$C$_6$H$_5$O$_7$ of 0.1 mol/L, the balance being water. Adjust the pH value of the plating solution to 2 and heat it to 55° C. Then select a constant voltage of 0.36 Å and an electroplating duration of 30 min to carry out the electrodeposition process.

Figure 15:
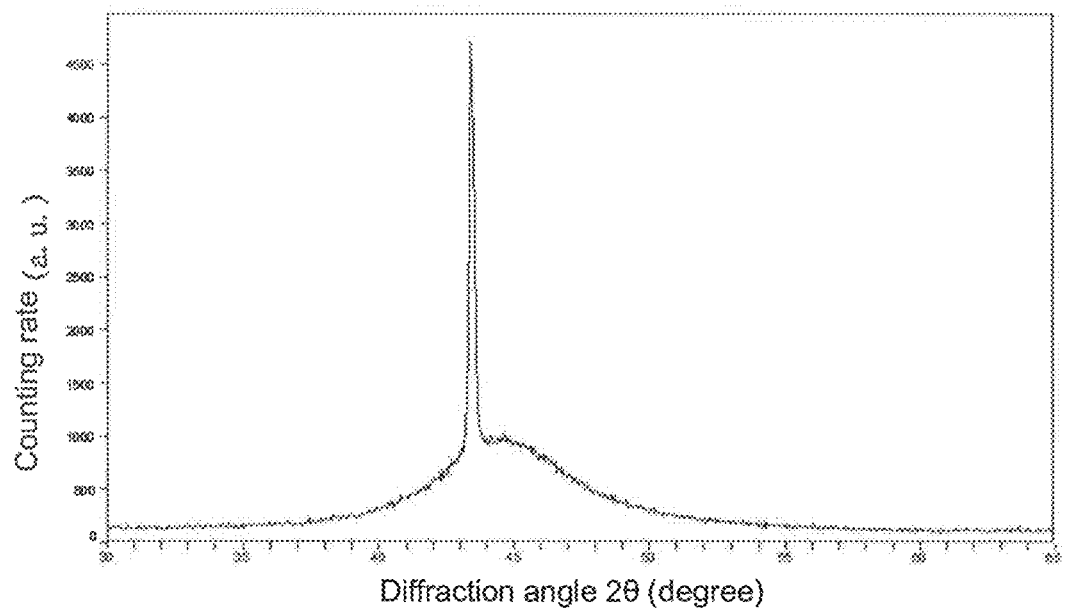
FIG. 15 is the X-Ray diffraction spectrum of the sample plating layer of example 7.
Figure 16:
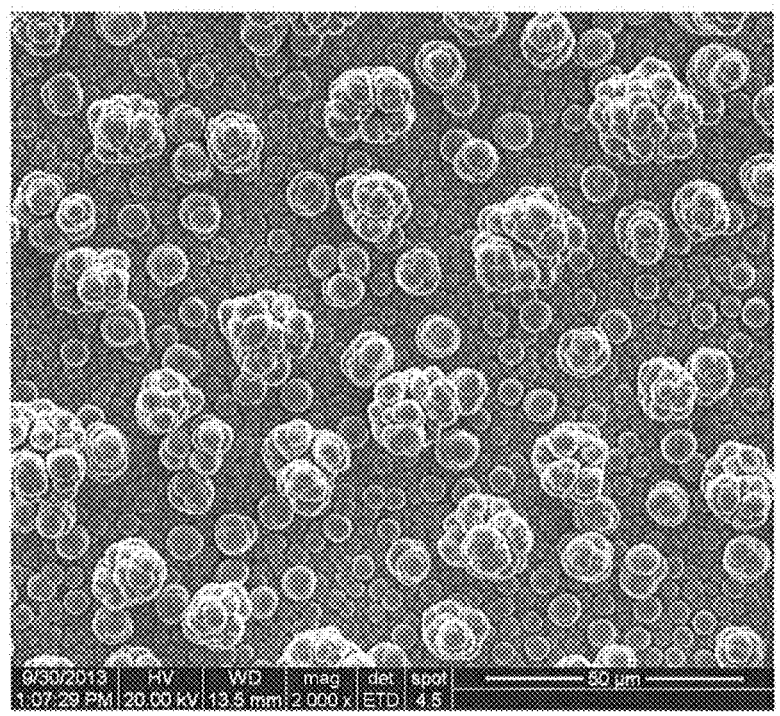
FIG. 16 is the morphology picture of the sample plating layer of example 7.
Figure 17:
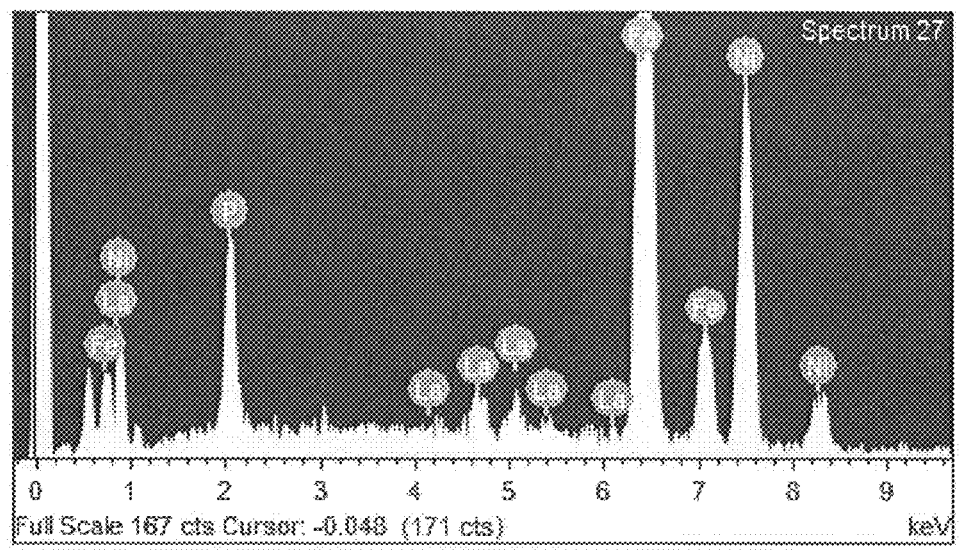
FIG. 17 is the composition analytical curve of the sample plating layer of example 7.
Figure 18:
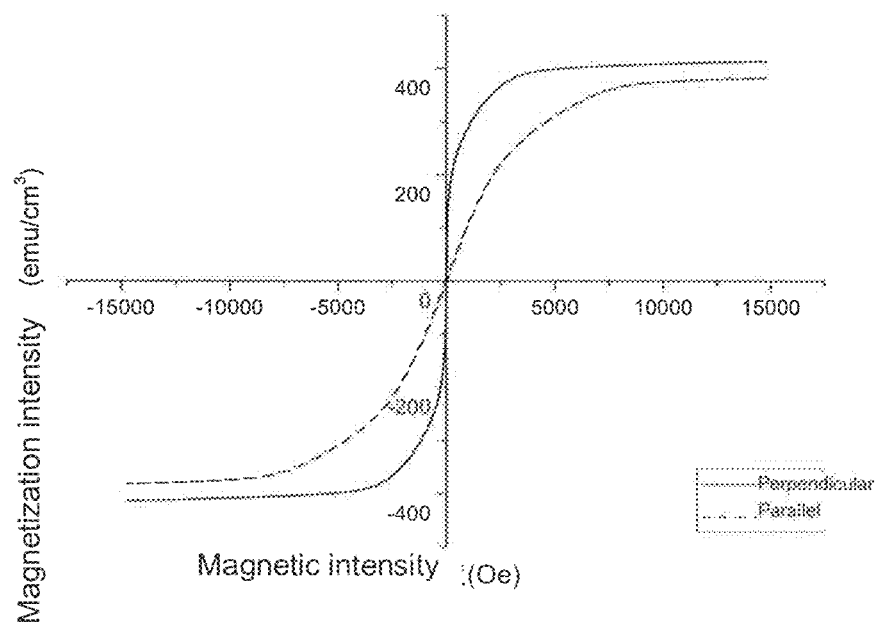
FIG. 18 is the performance curve of the sample plating layer of example 7.

The X-Ray diffraction spectrum of the plating layer is as shown in FIG. 15. The surface morphology of the plating layer is as shown in FIG. 16. The composition analytical curve of the plating layer is as shown in FIG. 17 and the composition of the prepared plating layer is: 54.84Fe 35.91Ni 5.14P4.11La (mass percentage). The thickness of the plating layer is 18.3 μm and the resistivity of the plating layer is measured as 6.92 Ω·μm. The hysteresis loop of the plating layer is as shown in FIG. 18. The coercivity in the direction parallel to the plating layer is 20.39 Oe and the magnetization intensity is 413.72 emu/cm$^3$. The coercivity in the direction perpendicular to the plating layer is 38.55 Oe and the magnetization intensity is 381.38 emu/cm$^3$.

The examples described as above are the preferred implementations according to the present invention. Nevertheless, the implementation of the present invention is not limited by any example as above. Any other change, modification, substitution, combination and simplification without deviation from the spirit and the principle of the present invention shall be equivalent replacement and be included in the protection scope of the present invention.

The invention claimed is:

1. An electrodeposition method for an Fe—Ni—P-RE multicomponent alloy plating layer, said layer comprising the elements of Fe, Ni, P and RE; wherein: the mass percentages are, respectively: 16~65% Fe, 25~70% Ni, 63~91% Fe+Ni, 1.6~25% RE and the balance being P; RE is rare earth element,
    wherein said electrodeposition method comprises electrodepositing the alloy layer on a substrate at constant voltage or constant current, and with a plating solution that comprises main salts, one or more complexing agents, and water, the chemical composition and concentration of said main salts include: ferrite salt or salts of 0.01-0.09 mol/L, nickel salt or salts of 0.01-0.09 mol/L, NaH$_2$PO$_2$ of 0.1 mol/L, RECl$_3$ of 0.5-4 g/L, H$_3$BO$_3$ of 0.5 mol/L; said one or more complexing agents includes Na$_3$C$_6$H$_5$O$_7$ of a concentration of 0.1-0.2 mol/L in the plating solution; the balance is water.

2. The electrodeposition method of the Fe—Ni—P-RE multicomponent alloy plating layer according to claim 1, wherein HCl or H$_2$SO$_4$ is used to adjust the pH value of the plating solution to 2~5, and the temperature of the plating solution is 45-70° C.

3. The electrodeposition method of the Fe—Ni—P-RE multicomponent alloy plating layer according to claim 1, wherein the current density at constant current is 3.0~9.0 A/dm$^3$, and the voltage at constant voltage is −0.9~−3.0V.

4. The electrodeposition method of the Fe—Ni—P-RE multicomponent alloy plating layer according to claim 1, wherein, in said plating solution, the ferrite salt or salts is one or two selected from FeSO$_4$ and FeCl$_2$; the nickel salt or salts is one or two selected from NiSO$_4$ and NiCl$_2$.

5. The electrodeposition method of the Fe—Ni—P-RE multicomponent alloy plating layer according to claim 1, wherein said one or more complexing agents further comprises, in a concentration of 0.005-0.015 mol/L, one or two selected from EDTA-2Na and NH$_4$Cl.

6. The electrodeposition method of the Fe—Ni—P-RE multicomponent alloy plating layer according to claim 1, wherein said plating solution further comprises a brightener that is saccharin sodium or butynediol, and the concentration of said brightener is 0.5-2.5 g/L; and a wetting agent that is sodium dodecyl sulfate of a concentration of 0.1-0.5 g/L.

7. The electrodeposition method of the Fe—Ni—P-RE multicomponent alloy plating layer according to claim 1, further comprising treating a surface of the substrate as follows: activating the surface with 5 wt. % of diluted H$_2$SO$_4$, and then washing the surface with de-ionized water and placing the surface in a plating tank to carry out the electrodeposition method.

8. The electrodeposition method of the Fe—Ni—P-RE multicomponent alloy plating layer according to claim 1, wherein the ratios among the components in the plating layer are adjusted by changing at least one of: (a) content of one or more of the main salts, (b) content of the one or more complexing agents in the plating solution, and (c) one or more method parameters used during the method of electrodeposition.

9. The electrodeposition method of the Fe—Ni—P-RE multicomponent alloy plating layer according to claim 1, wherein said Fe—Ni—P-RE multicomponent alloy plating layer is electrodeposited on the substrate which is a member of a component used in a microelectronic or semiconductor device.

10. The electrodeposition method of the Fe—Ni—P-RE multicomponent alloy plating layer according to claim 1, wherein the alloy electrodeposited in the electrodeposition method has the elements of Fe, Ni, P and RE; wherein: the mass percentages of the elements are respectively: 20~65% Fe, 25~70% Ni, 65~90% Fe+Ni, 2~25% RE and the balance being P.

11. The electrodeposition method of the Fe—Ni—P-RE multicomponent alloy plating layer according to claim 1, wherein the electrodeposited Fe—Ni—P-RE multicomponent alloy plating layer has one or two rare earth elements selected from La, Ce, Pr, Nd, Eu, Gd and Tb.

12. The electrodeposition method of the Fe—Ni—P-RE multicomponent alloy plating layer according to claim 11, wherein the electrodeposited Fe—Ni—P-RE multicomponent alloy plating layer has Ce or La as the rare earth element.

13. The electrodeposition method of the Fe—Ni—P-RE multicomponent alloy plating layer according to claim 1, wherein the substrate, which the applied Fe—Ni—P-RE multicomponent alloy plating layer is applied to, is a copper substrate.

* * * * *